United States Patent [19]

Höpener et al.

[11] 3,790,268

[45] Feb. 5, 1974

[54] SLIDE CHANGING DEVICE FOR SLIDE PROJECTORS

[75] Inventors: Clemens Höpener, Ruit; Wolfgang Ort, Stuttgart-bad Cannstatt, both of Germany

[73] Assignee: Eastman Kodak Company, Rochester, N.Y.

[22] Filed: Nov. 26, 1971

[21] Appl. No.: 202,359

[30] Foreign Application Priority Data
Jan. 22, 1971  Germany............... P 21 02 927.6

[52] U.S. Cl................................ 353/111, 353/113
[51] Int. Cl.............................................. G03b 23/02
[58] Field of Search............ 353/111, 112, 113, 114

[56] References Cited
UNITED STATES PATENTS
3,308,718  3/1967  Antos................. 353/112

2,922,335  1/1960  Lacoe.................. 353/112
3,495,902  2/1970  Michniewicz......... 353/112

FOREIGN PATENTS OR APPLICATIONS
1,142,710  4/1957  France................. 353/112

*Primary Examiner*—Harry N. Haroian

[57] ABSTRACT

A slide projector includes means for receiving a vertical slide stack. A device for indexing the lowermost slide to a film gate and then to a receptacle for receiving viewed slides includes a first slide member which is movable vertically past the gate to push slides out of the gate toward the receptacle. A second slide member is movable horizontally to index the lowermost slide of the stack to a chute. The slide drops along the chute into the film gate. The first and second slide members are interconnected so that movement of the first slide member in a vertical direction moves the second slide member in a horizontal direction.

6 Claims, 12 Drawing Figures

PATENTED FEB 5 1974 3,790,268

CLEMENS HÖPFNER
WOLFGANG ORT
INVENTORS

BY Milton S. Sales
W.H.J. Kline
ATTORNEYS

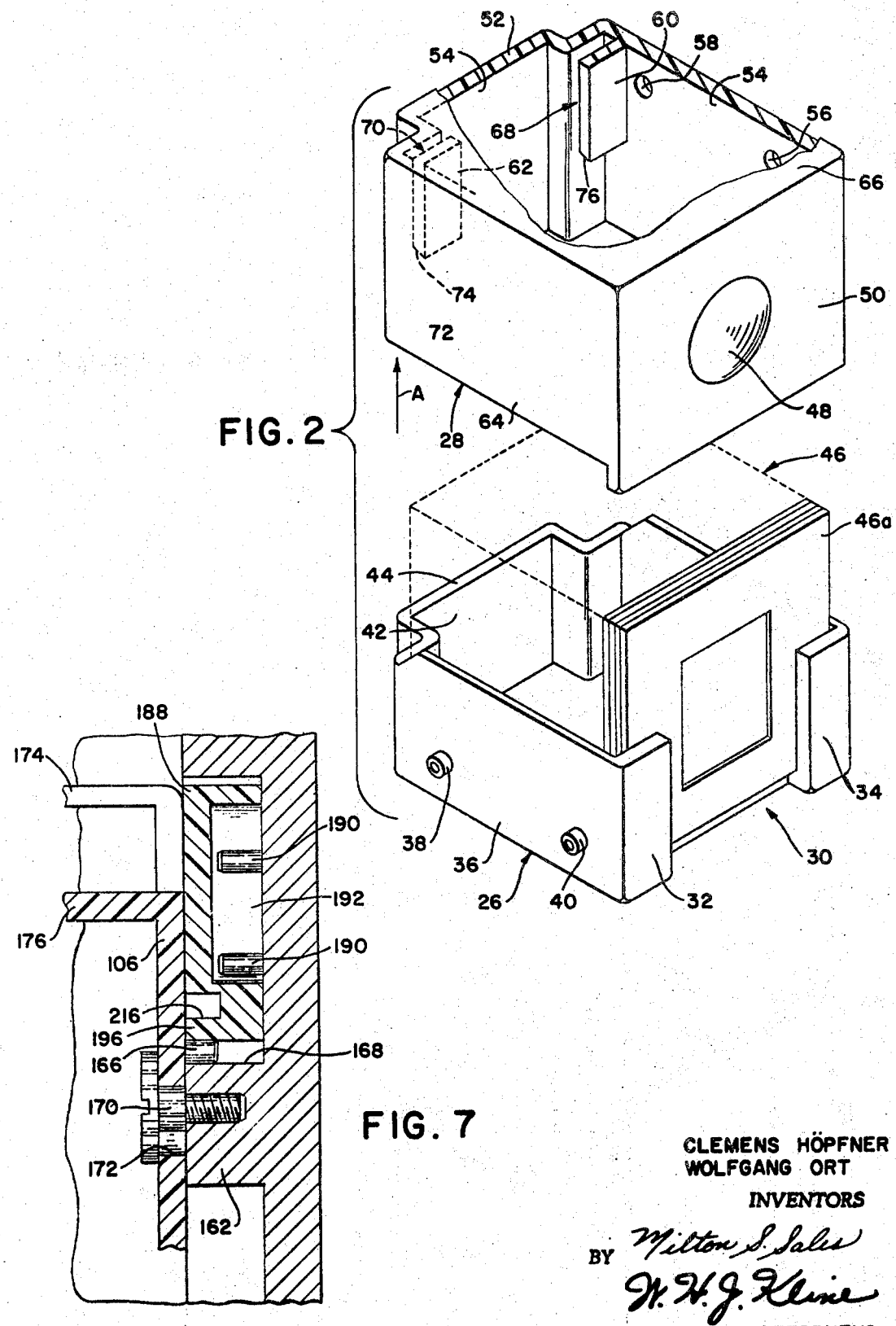

PATENTED FEB 5 1974

CLEMENS HÖPFNER
WOLFGANG ORT
INVENTORS

BY Milton S. Sales
W.H.J. Hine
ATTORNEYS

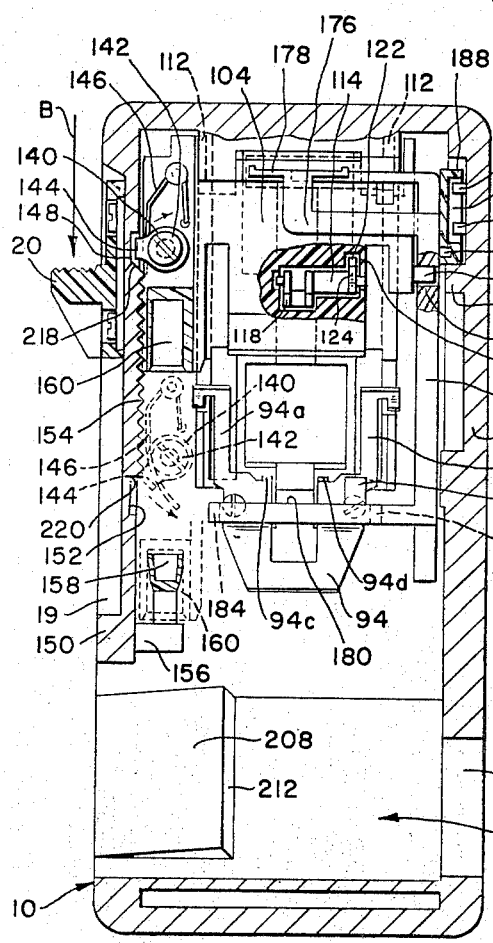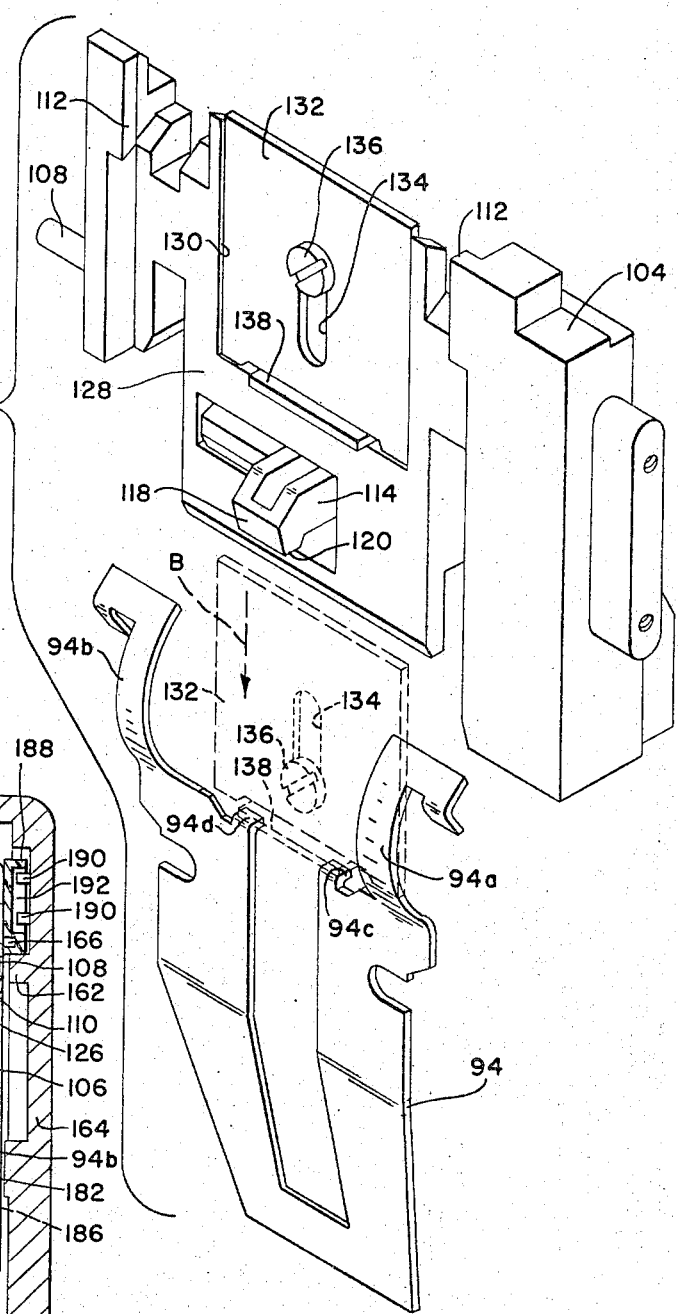

SLIDE CHANGING DEVICE FOR SLIDE PROJECTORS

BACKGROUND OF THE INVENTION

1. Field of the Invention

The invention relates to a device for viewing slide transparencies, and more particularly to an image changing device for a slide projector.

2. Description of the Prior Art

Slide changing devices for projectors are known in the art. Many such devices include a mechanism for taking the lowermost slide from a stack of slies, for moving that slide to a projection gate and for then indexing the viewed slide to a receptacle spaced either below or laterally of the gate. Some such devices are described in U.S. Pats. Nos. 2,503,239 which issued Apr. 11, 1950 to Joseph Antos and 3,495,902 which issued Feb. 17, 1970 to Edward Michniewicz and in French Pat. No. 1,412,710 in the name of M. Roger Flipo.

The apparatus shown by Michniewicz includes a mechanism for changing slides at the projection gate by pushing the viewed slide out of the gate by means of the incoming slide. Such a device could result in damaged slide mounts and possibly in blockage of the mechanism. In the Antos and Flipo patents, projectors are arranged so that slides drop toward the gate by gravity. In the Flipo patent, once a slide nears the gate, it is driven the rest of the way by a roller, thereby increasing the risk of jamming of the mechanism. The Antos mechanism permits an incoming slide to drop completely into the gate and, after viewing, to then drop to the receptacle. Since the mechanism includes no positive means of removing a slide from the gate, slides in damaged mounts may get jammed in the gate.

SUMMARY OF THE INVENTION

According to one feature of the present invention, a slide member is mounted on a projector for movement between a first position and a second position along a path parallel to and below a stack of slides to move the lowermost slide laterally from the stack to a position above a film gate. A member on the slide member moves to a position below the film gate as a slide is being removed from a stack for catching a slide as it moves into the gate by gravity.

According to another feature of the present invention, the slide member includes means for supporting the leading edge of the lowermost slide as that slide is removed from the stack. Abutment means stop the lateral movement of the slide whereby the supporting means moves beyond the leading edge to permit the slide to drop toward the gate.

According to yet another feature of the present invention, a second slide member is movable vertically past the film gate to push a viewed slide out of the gate, and means are provided for interconnecting the two slide members in perpendicular directions whereby a viewed slide is removed from the gate as the next slide is moved laterally from the slide stack.

The invention, and its objects and advantages, will become more apparent in the detailed description of the preferred embodiment presented below in conjunction with the accompanying drawings.

BRIEF DESCRIPTION OF THE DRAWINGS

In the detailed description of the preferred embodiment of the invention presented below, reference is made to the accompanying drawings in which:

FIG. 2 is an exploded view, partially broken away, of a slide container for use with the projector of FIG. 1;

FIG. 6 is a front sectional view of the projector shown in FIG. 1;

FIG. 7 is an enlarged view of a portion of FIG. 6;

FIG. 8 is a perspective view of a portion of the projector of FIG. 1;

DESCRIPTION OF THE PREFERRED EMBODIMENT

Because projectors are well known, the present description will be directed in particular to elements forming part of, or cooperating more directly with, apparatus in accordance with the present invention. It is to be understood that projector elements not specifically shown or described may take various forms well known to those skilled in the art.

Figure 1:
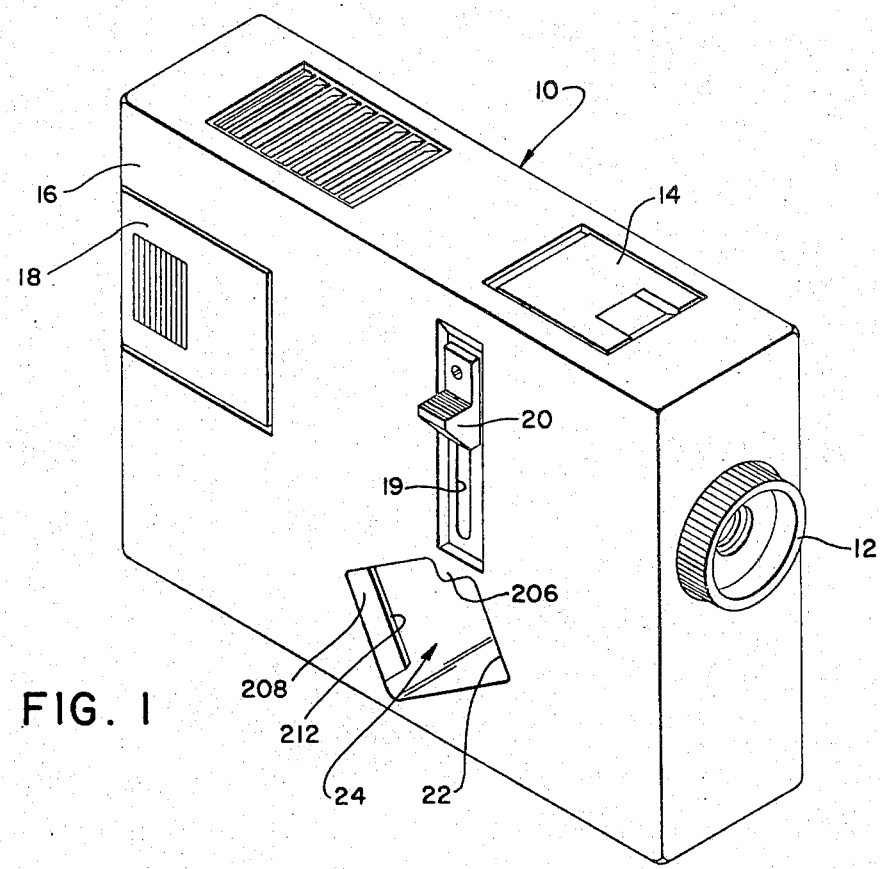
FIG. 1 is a perspective view of a slide projector according to the present invention.

FIG. 1 shows a projector 10 having a lens 12, a folding lid 14 which covers a slide receiving means, a lateral wall 16 with a flap 18 covering an access opening to the illumination device, a recess 19 with an operating key 20 of a slide changing device and a rhomboidal aperture 22 in a take-up chamber 24.

Figure 3:
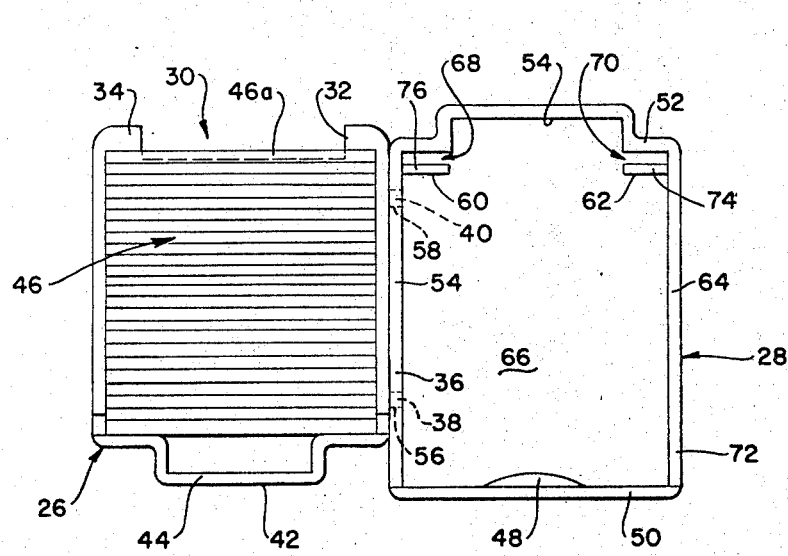
FIG. 3 is a top view of the slide container shown in FIG. 2.

FIGS. 2 and 3 show a slide container with a base 26 and a lid 28. The front wall of base 26 is provided with a recess 30, so that only two wall portions 32 and 34 are left. A lateral wall 36 has two, slightly concial plugs 38 and 40. A rear wall 42 projects rearwardly and its upper edge 44 terminates at a slightly lower level than the edges of the other walls. The base accommodates a slide stack 46.

Lid 28, which has been detached from base 26 in the direction of arrow A has a viewing lens 48 disposed in its front wall 50. The rear wall 52 has a bulge 54 which is adpated to serve as a focusing screen. A lateral wall 54 is provided with two bores 56 and 58 as well as with a guide portion 60 which is arranged along the wall at a distance of about one and a half times the thickness of a slide mount from the point where the lateral walls meet the rear wall 52. A similar guide portion 62 is arranged on lateral wall 64. These guide portions extend from the bottom wall 66 of lid 28 up to about half of the height of the surrounding wall so that one guide groove 68 and 70 each is formed (FIG. 3).

For enabling a viewing of the slides, base 26 and lid 28 of the slide container are attached to each other in side-by-side relation with plugs 38 and 40 inserted into bores 56 and 58, respectively, to form a unit. Each time the lowermost slide 46a is withdrawn from base 26 and inserted in guide grooves 68 and 70, the stack may be moved forward so that the viewed slide can be restored after viewing to base 26 between rearwardly projecting rear wall 42 and the last slide of stack 46.

When lid 28 is placed back onto base 26, the upper edge 72 of the lateral wall 64 of the lid rests on plugs 38 and 40. Likewise, rear wall 42 of the base with its upper edge 44 rests on the upper edges 74 and 76 of the two guide portions 62 and 60, respectively.

Figure 4:
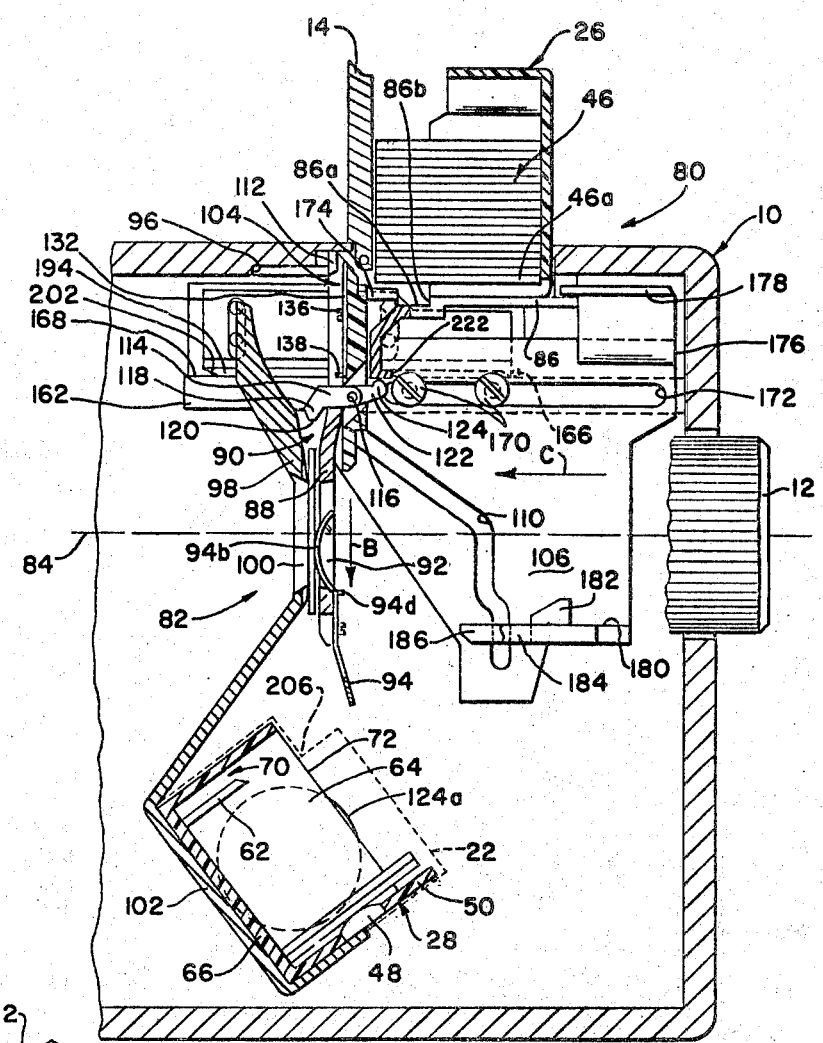
FIG. 4 is a sectional view of a portion of a slide projector shown in FIG. 1 with the illustrated elements in their normal positions.
Figure 9:
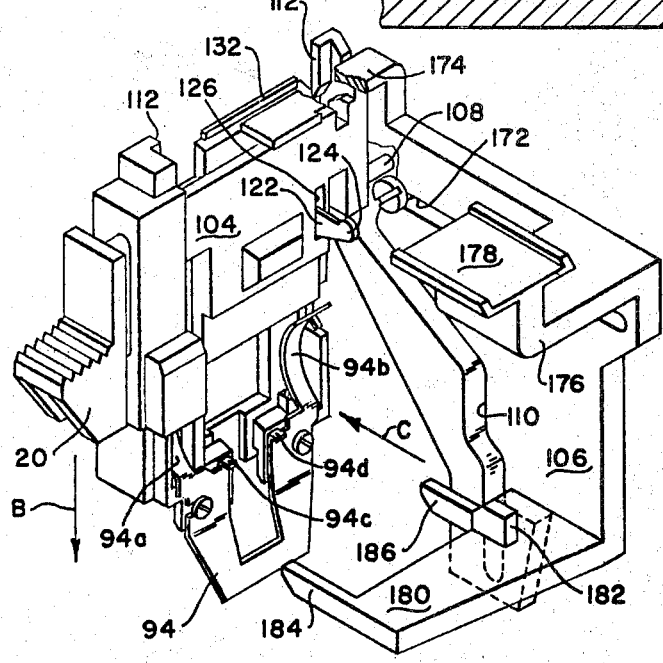
FIG. 9 is a perspective view of a portion of the projector of FIG. 1.
Figure 5:
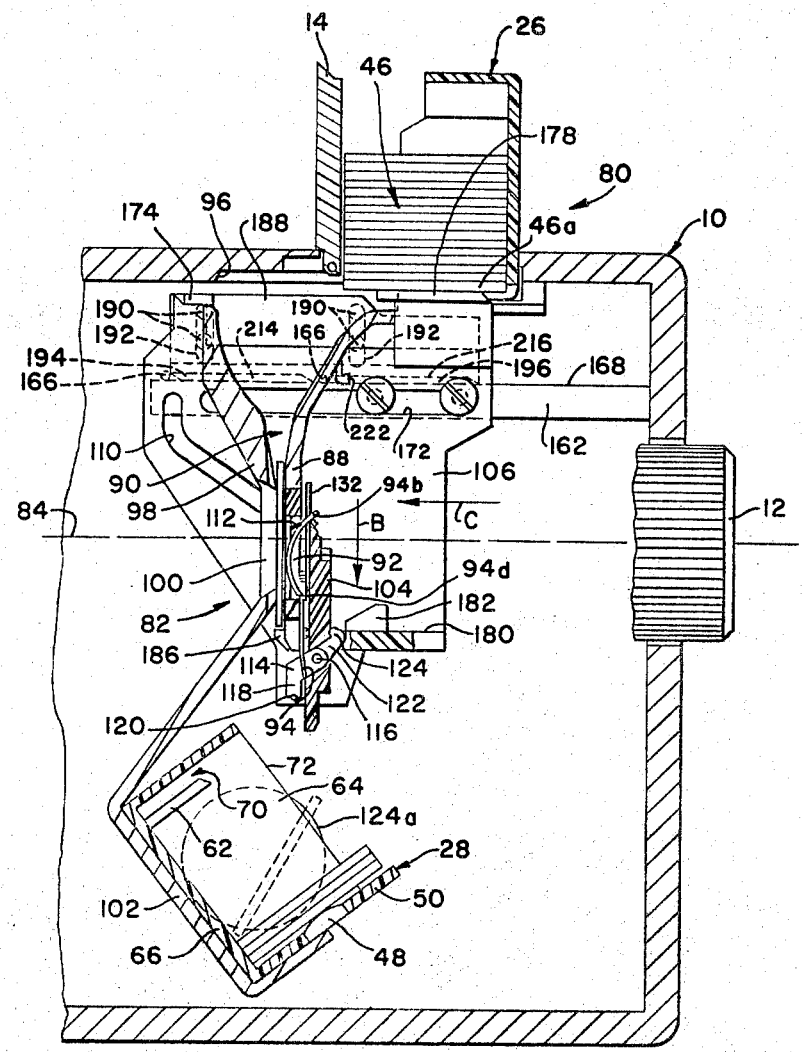
FIG. 5 is a view similar to FIG. 4 with the projector elements in their positions immediately after a slide has been changed and before the elements return to their FIG. 4 positions.

In FIGS. 4 and 5, the base 26 of the slide container is shown inserted into the container receiving means 80 located above a film gate 82 and the optical axis 84 with the recessed front 32 pointing downwardly. Now the upwardly folded lid 14 serves as a stop for slides 46 stacked in base 26. A bottom plate 86 on which base 26 is located has a step 86a, to whose edge 86b the edge of the wall of base 26 corresponds. Following the step, bottom plate 86 extends downwardly in an oblique direction and forms a front wall 88 of a passageway leading to a chute 90. The wall of said passageway is contined in a vertical direction and is provided with projection aperture 92 at the level of optical axis 84, ending approximately in the center of the projector. Below projection aperture 92, the front of wall 88 is provided with U-shaped retaining spring 94 which is designed in such a manner that its lower part projects beyond wall 88 and prolongs the chute in downward direction (FIGS. 4 and 9). Each of the upper edges of the two legs of the spring comprises a resilient tongue 94a and 94b and a bent lug 94c and 94d (FIGS. 6, 8, and 9).

As appears further from FIGS. 4 and 5, the inside of the upper housing wall of the projector comprises a stopping edge 96. Below this stopping edge begins the lower wall 98 of the passageway leading to chute 90, said wall extending downwardly in an oblique direction. Wall 98 is also continued in a vertical direction and is equally provided with a projection aperture 100 at the level of the optical axis 84. The projection apertures of both walls including the retaining spring 94 form the film gate with is referred to by numeral 82. Rear wall 98 is then continued below film gate 82 and forms the bottom 102 of take-up chamber 24 in which lid 28 of base 26 which is attached above the film gate is inserted.

As appears in particular from FIG. 9, the slide changing device consists of two slide members 104 and 106 which are arranged transversely of each other. The first slide member 104 is provided on its narrow side facing second slide member 106 with a bolt 108 which, as will be described below, becomes effective in a guide groove 110 of the second slide member 106. First slide member 104 carries at its other narrow side operating key 20 and is seated in front wall 88 of the film gate to be displaceable in the direction of arrow B contrary to the bias of a spring (not shown). In its upper half it is provided with two cams 112 acting on the two resilient tongues 94a and 94b during the displacing process. An engaging pawl 114 is rotatably mounted by means of a friction bearing pin 116 approximately in the center of the slide member (FIGS. 4 and 6). It is a two-armed pawl, one arm 118 projecting into chute 90 with its downwardly directed nose 120, whereas the other arm 122 extends with its rounded off, upwardly directed nose 124 in the opposite direction out of a recess 126 of the first slide member 104. Above the pawl arrangement, slide member 104 is recessed on the side 128 which faces the chute (FIG. 8). In a recess 130, a cover plate 132 is displaceably seated by means of a pin-slot connection 134 and 136. At its lower edge, it has a stop 138. In the vicinity of actuating key 20, a locking pawl 140 of a reversal prevention means is arranged. It is mounted to be rotatable about collar screw 142 and it has a bent stop nose 144 which is abutted against by the free leg of a spring 146, keeping pawl 140 in the position shown in FIG. 6, stop nose 144 projecting into an upper recess 148 at the inside of a lateral wall 150 of the projector. Inside of lateral wall 150 is provided further below with a second recess 152, and between the two recesses 148 and 150 with a toothed portion 154. The lateral wall further comprises a cam 156 carrying an attenuating cylinder 158 which is placed into functional connection with a bore 160 arranged in slide member 104 below pawl 140.

Second slide member 106, whose main portion is formed by a plate, is movably supported at a bar 162 arranged at the inside of the lateral wall 164 of the projector. For this purpose two pins 166 (FIGS. 6, 7 and 10) are arranged at the rear side of slide member plate 106 by which slide member 106 is attached to bar 162. Pins 166 rest on the upper edge 168 of bar 162 for sliding thereon during the motion of the slide member. Bar 162 is further provided with two collar screws 170 (FIGS. 4 and 7) projecting through a horizontal slot 172 in the upper half of slide member plate 106, so that they are secured against dropping off. In the area where the upper edge of slide member plate 106 meets the first slide member 104 it comprises a bent finger whose upper surface 174 serves as a slide support. The rearward portion of the upper edge of the slide member carries a lug 176 whose end is bent upwardly and is provided with a driving plate 178. In the area of the lower half, part of the slide member plate is bent at a right angle. The bent portion 180, which carries a stop nose 182 on its surface, has the shape of a fork whose prongs 184 and 186 are directed towards film gate 82. Curved guide groove 110 extends in the disk-shaped main portion from the left-hand side at the top of the center at the bottom. In this guide groove, bolt 108 of the first slide member 104 is vertically movable. If upon actuation of the slide members, the first slide member 104 is moved in the direction B, the second slide member 106, which is controlled via guide groove 110, is moved in horizontal direction indicated by arrow C. When first slide member 104 is restored to its upper initial position, second slide member 106 is automatically returned into its initial position contrary to the direction indicated by arrow C.

Figure 10:
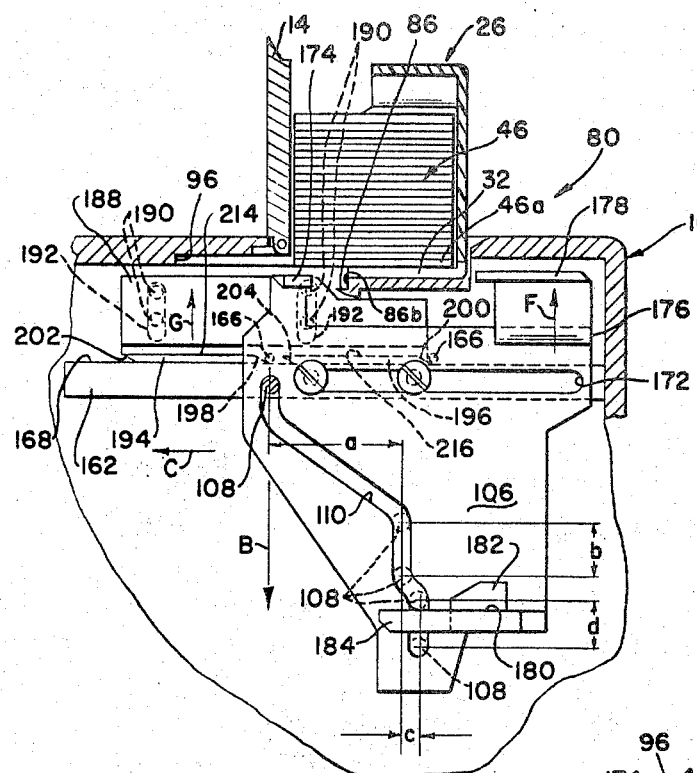
FIG. 10 is a view, partially in section, of a part of the slide changing device in the image position.

This reciprocating motion of second slide member 106 is performed in two planes. As is shown in FIGS. 6, 7 and 10, a control plate 188 is located between second slide member 106 and the inside of lateral wall 164 of the projector and rests on the upper edge 168 of bar 162. The inside of the lateral wall 164 of the projector is provided with four pins 190, of which always two are arranged in superposed relation and extend into two slots 192 at the rear side of control plate 188. These pin-slot connections are designed in such a manner that control plate 188 can be moved upwardly in the direction of arrow G. At the lower edge of the front of the control plate two extended cams 194 and 196 are disposed, each of which has an inclined surface (198 and 200) at the front and one (202 and 204) at the back.

Figure 10A:
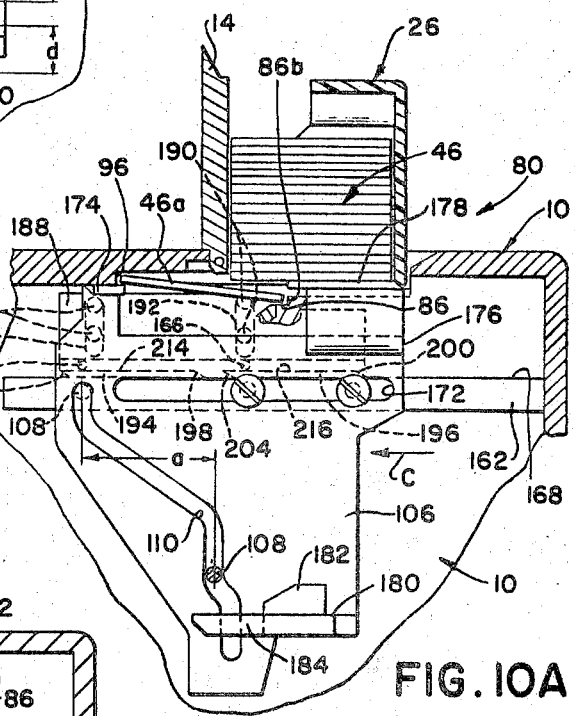
FIG. 10A is a view similar to FIG. 10 showing the elements while the lowermost slide is being removed from the stack.

Operation of the apparatus is effected as follows: As has been described above, the base portion 26 of the slide container is inserted into container receiving means 80 with the recessed front facing downwardly. Now top 28 is inserted into take-up chamber 24 through rhomboidal aperture 22. A nose 206 arranged in the upper corner of aperture 22 (FIGS. 1 and 4) ensures that cover 28 is inserted in the proper position. The cover first slides over the sloping insertion surface 208 of a rib 212 arranged on bottom 102 of take-up chamber 24 and is placed behind the steeper inclination 212. Owing to the breadth of rib 212, a correct orientation of cover 28 relative to the optical axis is ensured. If first slide member 104 is moved by way of actuating key 20 vertically in the direction of arrow B, second slide member 106 is displaced in the direction of arrow C by the bolt and guide groove 108 and 110. During this displacing motion, slide member 106 slides on the upper edge 168 of bar 162 by means of its two pins 166. During this process, the pins reach the inclined surfaces 198 and 200 of cams 194 and 196 which are arranged at control plate 188. Slide member 106 is lifted in the direction of arrow F (FIGS. 10 and 10A) by the thickness of cams 194 and 196 and continues to move on the upper edges 214 and 216 of the cams in the direction of arrow C. In doing so, its drive plate 178 enters recess 30 in the front wall of base portion 26 of the container, pushing the lowermost slide 46a out of the base portion. The front edge of said slide is placed on support 174 of the slide member and remains in the horizontal position until it abuts against the edge 96 of the housing because the other half of the slide rests on the lower front wall of the container. Shortly before the front edge of the slide strikes against stop 96 of the housing, the front of driving plate 178 reaches edge 86b of stepped bottom surface 86 and 86a. This corresponds to the position of plug 108 in FIG. 10A, by the vertical movement of which the second slide member 106 has covered a first long distance a in the direction of arrow C. During the following travel along path b of the guide groove (FIG. 10) the movement of the slide member in the direction of arrow C is briefly interrupted and the slide has sufficient time for dropping with its rear edge on step 86a. In the path c of the guide groove, the second slide member 106 is moved for another short distance until support 174 is placed behind stopping edge 96 of the housing. Then only may the slide drop freely for reaching the film gate 82. This is illustrated in FIG. 10B.

Figure 10B:
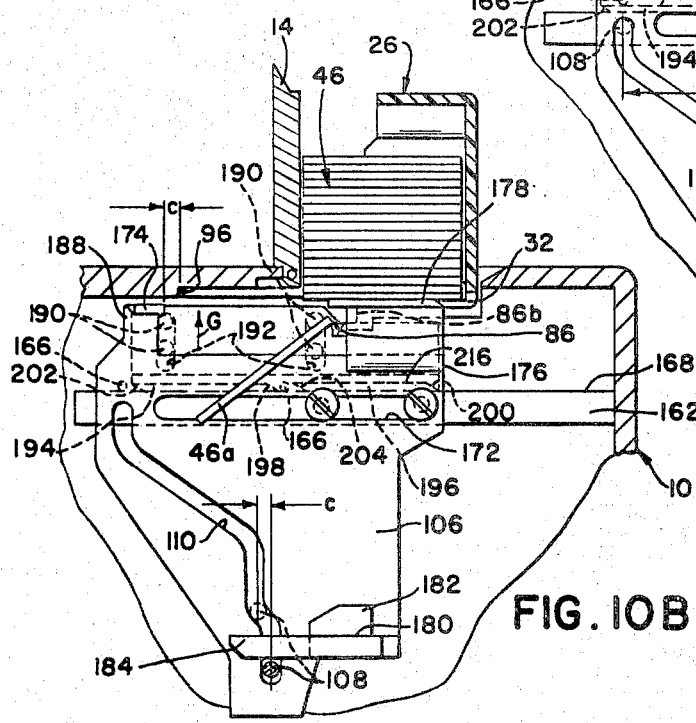
FIG. 10B is a view similar to FIGS. 10 and 10A showing the elements as the lowermost slide is released for movement toward the film gate.

During the travel along the short path c the second slide member 106 leaves with its pins 166 cams 194 and 196 and drops back onto the upper edge 168 of bar 162 (FIGS. 6 and 10B). During the return movement, the pins travel on this edge 168, lifting the control plate 188 in the direction of arrow G by the rear inclined surfaces 202 and 204 of the cams. By this return movement of slide member 106, which is performed at a level which is lower by the thickness of a cam, driving plate 178 is returned below slide stack 46. When the initial position has been reached, pins 166 leave the lower edges of the cams, so that control plate 188 may drop back onto bar 162 and the cycle of operations is repeated during a renewed movement of the slide member (FIG. 10).

FIG. 6 shows the manner in which nose 144 of locking pawl 140 strikes against an inclined surface 218 of toothed portion 154 at the housing when the first slide member 104 is moved in the direction of arrow B and how it is turned in the direction of arrow D contrary to the bias of spring 146. As soon as nose 144 of the pawl skips the first tooth of toothed portion 154, a reversal of the motion of the slide member is no longer possible. Only when recess 152 at the lower end of toothed portion 154 has been reached, locking pawl 140 is pivoted out of its locking position by spring 146. When the actuating key 20 is freed, and when slide member 104 is returned to the initial position by a tension spring (not shown), nose 144 of the pawl reaches an inclined surface 220 of toothed portion 154 and is moved into the position shown in FIG. 6 by a dash-dotted line, so that the locking effect is reversed.

During this movement of the first slide member 104 in the direction of arrow B and while the second slide member 106 passes along the long path a (FIG. 10A), the downwardly directed nose 120 of engaging pawl 114 at the first slide member 104 is placed on the upper edge of a preceding slide located in film gate 82, pushing it out of the projection position (FIG. 4). As has been mentioned already, the second slide member 106 is moved in the section c of the guide path a small way in the direction of arrow C, its support 174 being moved behind stop edge 96 of the housing (FIG. 10B) and the slide being released for dropping by gravity. By this movement, also the two prongs 184 and 186 of fork 180 reach the dropping range of the slide below the film gate 82, stop nose 182 of fork 180 striking against arm 122 of engaging pawl 114, pivoting said pawl about friction bearing pin 116 into the position shown in FIG. 5. Thus it is ensured that during the upward motion of the first slide member 106, the slide which has dropped into the projection position is not touched. In the upper position of slide member 106, pawl 114 is restored to the engaging position (FIG. 4) by a housing stop 22. Only after the two prongs 184 and 186 have been moved into the receiving position below film gate 82, the two resilient blades 94a and 94b are lifted by means of the two slide cams 112 (FIG. 5) for enabling the already dropping slide to enter film gate 82. This is accomplished during the motion along path d of the guide groove (FIG. 10).

When the first slide member 104 is depressed further by the amount d of the guide groove, piston 158 penetrates bore 160 in slide member 104, as illustrated in FIG. 6. Thus the vertical movement of slide member 104 is delayed and softly absorbed when it reaches the lowermost position. At the moment slide member 104 is released in that key 20 is no longer depressed, the pneumatic braking device 160 and 158 effects a delayed initial restoring motion. Thus the dropping slide has time enough to reach the projection position before the resilient blades 94a and 94b are released again by the slide member 104 returning in upward direction. Otherwise the resilient blades would exercise a pressure on the dropping slide too early.

Another function of first slide member 104 consists in a masking of the ray path during the exchange of slides. This is accomplished by means of mask 132

(FIGS. 4, 5 and 8). During the downward motion of the slide member 104 it rests with its stop 138 on lugs 94c and 94d of U-shaped holding spring 94 and is kept in this position in which it covers the film gate, while slide member 104 moves downwardly by another portion.

All sides are successively collected in lid 28 (FIGS. 4 and 5). Said lid is ejected after slide display in the direction of insertion aperture 22 via a round aperture 124 and is withdrawn from take-up chamber 24 for being combined again with base 26. At that stage, slide stack 46 is arranged in the slide container in the same order and position as before the display.

The invention has been described in detail with particular reference to a preferred embodiment thereof, but it will be understood that variations and modifications can be effected within the spirit and scope of the invention.

We claim:

1. A slide changing device for a slide projector having a film gate and means above the film gate for receiving a plurality of slides arranged in the form of a stack; said slide changing device comprising:
   a slide member mounted on the projector for movement between first and second positions along a path generally parallel to the planes of the slides in the stack;
   drive plate means on said slide member for (1) engaging the lowermost slide in the stack and (2) moving said lowermost slide laterally from the stack when said slide member moves toward said first position;
   means defining a chute for guiding to said film gate a slide removed from the stack by said drive plate means;
   means mounted on said slide member for movement to a position below said film gate when said slide member is moved to its first position for receiving a slide dropping through said chute; and
   means for holding that slide at the film gate while said slide member is in its second position.

2. A slide changing device for a slide projector having a film gate and means above the film gate for receiving a plurality of slides arranged in the form of a stack; said slide changing device comprising:
   a slide member mounted on the projector for movement between first and second positions along a path generally parallel to the planes of the slides in the stack;
   drive plate means on said slide member for (1) engaging the lowermost slide in the stack and (2) moving said lowermost slide laterally from the stack when said slide member moves toward said first position;
   means defining a chute for guiding to said film gate a slide removed from the stack by said drive plate means;
   means on said slide member for supporting the leading edge of the lowermost slide in the stack as that slide is moved laterally by said slide member moving toward said first position; and
   abutment means for stopping said lateral movement of said lowermost slide before said slide member reaches said first position, whereby said supporting means moves beyond said leading edge to permit the slide to drop through said chute.

3. A slide changing device for a slide projector having a film gate and means above the film gate for receiving a plurality of slides arranged in the form of a stack; said slide changing device comprising:
   a drive plate having a leading edge, said drive plate being mounted on the projector for movement (1) in a direction parallel to the plane of slides in the stack between a first position wherein said leading edge is behind and facing an edge of the lowermost slide in the stack and a second position spaced from said first position in the direction faced by said leading edge and (2) in a direction perpendicular to said planes between positions respectively in and out of the plane of the lowermost slide;
   means for moving said drive plate from its first to said second position and from said second to said first position;
   means for moving said drive plate (1) into the plane of the lowermost slide as said drive plate is moved from its first to its second position and (2) out of the plane of the lowermost slide as said drive plate is moved from its second to its first position.

4. A slide changing device for a slide projector having a film gate and means above the film gate for receiving a plurality of slides arranged in the form of a stack; said slide changing device comprising:
   a slide member mounted on the projector for movement between first and second positions along a path generally parallel to the planes of the slides in the stack;
   drive plate means on said slide member for (1) engaging the lowermost slide in the stack and (2) moving said lowermost slide laterally from the stack when said slide member moves toward said first position;
   means defining a chute for guiding to said film gate a slide removed from the stack by said drive plate means;
   means for resiliently holding slides in the film gate;
   a second slide member movable downwardly in a direction perpendicular to the path of said first mentioned slide member for pushing slides out of said gate; and
   means interconnecting said first and second slide members for moving said first slide member toward said first position when said second slide member is moved downwardly.

5. A slide changing device as defined in claim 4 further comprising means to prevent reversal of movement of said second slide member until a slide has been completely pushed from the gate.

6. A slide changing device as defined in claim 4 further comprising pneumatic means for damping movement of said second slide member.

* * * * *